(12) United States Patent
Carpigiani De Almeida et al.

(10) Patent No.: US 11,204,113 B2
(45) Date of Patent: Dec. 21, 2021

(54) PIPE FOR CONTROL AND FORCED CIRCULATION OF CORROSION-INHIBITING FLUIDS IN THE ANNULUS THEREOF

(71) Applicant: PETRÓLEO BRASILEIRO S.A.-PETROBRAS, Rio de Janeiro (BR)

(72) Inventors: Marcos Carpigiani De Almeida, Rio de Janeiro (BR); George Carneiro Campello, Rio de Janeiro (BR); Jonatas Ribeiro, Rio de Janeiro (BR); Rafael Guimarães De Mello Sobreira, Rio de Janeiro (BR); Walter Carrara Loureiro Junior, Rio de Janeiro (BR); Marcelo Torres Piza Paes, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 42 days.

(21) Appl. No.: 16/618,748

(22) PCT Filed: May 30, 2018

(86) PCT No.: PCT/GB2018/051462
§ 371 (c)(1),
(2) Date: Dec. 2, 2019

(87) PCT Pub. No.: WO2018/220360
PCT Pub. Date: Dec. 6, 2018

(65) Prior Publication Data
US 2020/0166158 A1   May 28, 2020

(30) Foreign Application Priority Data
May 30, 2017   (BR) ...................... 10 2017 011386-8

(51) Int. Cl.
*F16L 11/08* (2006.01)
*F16L 33/01* (2006.01)
(Continued)

(52) U.S. Cl.
CPC ............. *F16L 11/083* (2013.01); *F16L 33/01* (2013.01); *B29L 2023/005* (2013.01);
(Continued)

(58) Field of Classification Search
CPC ........ F16L 11/083; F16L 11/082; F16L 33/01; F16L 58/00; B29L 2023/005;
(Continued)

(56) References Cited

U.S. PATENT DOCUMENTS 8,256,469 B2   9/2012   Felix-Henry
8,820,412 B2   9/2014   Critsinelis et al.
(Continued)

FOREIGN PATENT DOCUMENTS

EP   2729723 B1   7/2015
WO   2011/026801 A1   3/2011
(Continued)

OTHER PUBLICATIONS

International Search Report issued in International Application No. PCT/GB2018/051462 dated Sep. 11, 2018 (5 pages).
(Continued)

*Primary Examiner* — Craig M Schneider
*Assistant Examiner* — David R Deal
(74) *Attorney, Agent, or Firm* — Osha Bergman Watanabe & Burton LLP (57) ABSTRACT

A pipe is used for control and forced circulation of corrosion-inhibiting fluids in an annulus thereof, the annulus located between an inner pressure barrier and an outer cover of the pipe and containing a number of layers. The pipe includes two layers of tensile armor within the annulus; at
(Continued)

least one injection pipe laid helicoidally on the longitudinal extension of the pipe; at least one return pipe laid helicoidally on the longitudinal extension of the pipe; and a ventilation layer within the annulus, the ventilation layer being configured to facilitate the flow of fluids longitudinally through the annulus of the pipe.

19 Claims, 4 Drawing Sheets

(51) Int. Cl.
  *B29L 23/00* (2006.01)
  *E21B 17/01* (2006.01)
  *F16L 58/00* (2006.01)

(52) U.S. Cl.
  CPC ... *B32B 2307/554* (2013.01); *B32B 2307/714* (2013.01); *B32B 2597/00* (2013.01); *E21B 17/01* (2013.01); *F16L 11/082* (2013.01); *F16L 58/00* (2013.01)

(58) Field of Classification Search
  CPC ........ B32B 2307/554; B32B 2307/714; B32B 2597/00; E21B 17/01
  USPC .......................................... 138/134, 138, 148
  See application file for complete search history.

(56) References Cited

U.S. PATENT DOCUMENTS

| | | | |
|---|---|---|---|
| 8,857,521 B2 | 10/2014 | Clements | |
| 9,523,446 B2* | 12/2016 | Kassow | F16L 11/083 |
| 9,546,751 B2* | 1/2017 | Roberts | B23P 11/00 |
| 9,851,027 B2* | 12/2017 | Anelli | F16L 11/083 |
| 2013/0068464 A1* | 3/2013 | Critsinelis | E21B 17/18 |
| | | | 166/338 |
| 2013/0068465 A1 | 3/2013 | Critsinelis et al. | |
| 2017/0074428 A1* | 3/2017 | Carney | F16L 11/12 |
| 2017/0341149 A1* | 11/2017 | Clements | B33Y 10/00 |
| 2019/0226614 A1* | 7/2019 | Carney | F16L 11/12 |
| 2019/0338868 A1* | 11/2019 | Hjorth | B32B 27/34 |
| 2020/0049280 A1* | 2/2020 | Wang | H01B 13/0036 |

FOREIGN PATENT DOCUMENTS

| | | |
|---|---|---|
| WO | 2012092931 A1 | 7/2012 |
| WO | 2014023311 A1 | 2/2014 |
| WO | 2015121616 A1 | 8/2015 |

OTHER PUBLICATIONS

Written Opinion issued in International Application No. PCT/GB2018/051462 dated Sep. 11, 2018 (6 pages).

* cited by examiner

PIPE FOR CONTROL AND FORCED CIRCULATION OF CORROSION-INHIBITING FLUIDS IN THE ANNULUS THEREOF

CROSS-REFERENCE TO RELATED APPLICATION

This application claims the benefit of priority to BR 10 2017 011386-8, filed 30 May 2017, which is incorporated herein by reference in its entirety.

FIELD OF THE INVENTION

The present invention relates to pipeline and riser technologies. More particularly, the present invention relates to pipelines with a system for control and forced circulation of fluids through the annulus of the pipeline.

BACKGROUND OF THE INVENTION

Petroleum production in the offshore environment makes wide use of ascending pipelines, known as risers. Such a pipeline, consisting of risers and the flowlines connected to them, which are fixed on the seabed, may be flexible or rigid, has the function of collecting the oil produced by the subsea well, conveying it to a floating unit or platform, and then sending it to tankers or directly to onshore facilities. Risers and flowlines are also used for injecting gases, chemicals and other fluids from the floating unit or platform to the wells for various purposes such as stimulation of wells or storage of corrosive gases in tanks.

Flexible pipes of the "unbonded" type designed according to standards API Spec 17J and API RP 17B, the descriptions of which are incorporated herein by reference, possess armouring normally constructed of carbon steel and carbon-manganese steel, which is confined within the annulus between two permeable polymer layers, the first layer (referred to as the "barrier") for isolating the fluid conveyed inside the pipe and the second for isolating the surroundings (referred to as the "outer cover" or "outer sheath"). That is, the barrier and outer cover can be considered to be inner and outer sheaths of the pipe. The term "annulus" is used through the present document to refer this space between the barrier and the outer cover.

The armouring is susceptible to corrosion by corrosive gases ($CO_2$ and $H_2S$) and water that permeates from inside the pipe, through the polymer of the barrier. Any loss of hermeticity of the annular space also results in the presence of water in the annulus.

Corrosion may lead to failure mechanisms, such as stress corrosion—caused by $CO_2$ or by $H_2S$—and pitting corrosion. Stress corrosion caused by $CO_2$ (SC—$CO_2$) is a failure mechanism that is not covered by the current versions of the international standards for flexible pipes (API Spec 17J and ISO-13628-2). The contents of standard ISO-13628-2 are also relevant and incorporated herein by reference.

At present, flexible pipes are normally constructed without an integrated system (to the pipe body and connectors) for forced circulation with the annulus between the outer cover and the barrier, which would make it possible to displace the corrosive gases that may be present in its annulus, so as to reduce their concentration or fugacity and prevent or minimize their corrosive effects.

In some cases in the oil industry, the various sections or segments of a flexible pipe, which are provided with flanges at their ends, have their annular spaces interconnected so as to allow a reduction in the concentrations of the corrosive gases. However, this conventional technical solution is not sufficient to prevent corrosion due to condensation of water in the annulus or loss of integrity of the annulus through ingress of sea water. In general, the annular space is very restricted, making circulation of the gases that have permeated and of other fluids difficult. Consequently, removal or dilution to acceptable levels of corrosive fluids also becomes difficult, if forced circulation is not used or there is no change in the design features of the flexible pipe.

The flexible pipes currently on the market have layers on their annulus that make circulation of fluids difficult, and in which droplets or bubbles of $CO_2$ with dissolved water may be trapped owing to the geometric characteristics both of some metallic layers (for example, "Z-shape", "T-shape" or "C-shape" layers, as illustrated in FIG. 7 of the practical recommendations API RP 17B) and in the interstices between metallic and polymer layers, or else in elements arranged between these layers, such as anti-wear tapes or anti-buckling tapes.

Document US20130068465A1, for example, discloses a method for circulation of fluids through the annulus of a flexible riser, which requires the use of an umbilical with a pipe for allowing circulation of, for example, corrosion inhibitor in the annulus. However, that document does not provide changes in the structure of the flexible pipe or connectors necessary to allow mitigation of the problems of corrosion in the armouring of the flexible pipe, such as SC—$CO_2$ and pitting corrosion. The document only contemplates a single continuous riser, rather than a riser consisting of several segments.

As such, document US20130068465A1 does not consider how to mitigate corrosion in the armouring of the flexible pipe in the case of loss of hermeticity of the annulus, for example due to damage in the outer cover in an area (e.g. a particular segment, when the flexible pipe is made up of several segments). In such a scenario, the circulation would be interrupted in the area in which the annulus becomes flooded with sea water. Moreover, the method taught by US20130068465A1 requires additional support in the platform for connection of each umbilical that will allow the necessary circulation in the annulus of the riser.

Document U.S. Pat. No. 8,857,521 relates to a system of flexible pipes and connector that allows relief of gases that have permeated into the layers of the pipeline (annulus) in the case of rapid depressurization, to avoid the collapse of layers. This document says nothing with regard to questions of corrosion prevention in pipeline armouring.

Even if the method and the connector proposed in U.S. Pat. No. 8,857,521, for allowing the annulus to be connected to the interior of the flexible pipeline, were proposed for purposes of ventilation of the fluid in the annulus, this ventilation would not be possible. That is because, in a situation in which the annulus and the interior of the pipeline are connected to the flexible pipe in operation, the pressure inside the pipeline will be greater than the pressure in the annulus. This would not allow the fluid in the annulus to return to the interior of the pipeline, and thus would not remove any corrosive chemicals that might be accumulating. Moreover, there would also be the possibility of the occurrence of migration of the fluid conveyed inside the pipeline directly to the annulus, which would increase corrosion.

Document WO2011026801A1 is based on corrosion prevention of armouring, giving consideration to filling of the annular space of flexible pipes with protective fluid, for example MEG (monoethylene glycol) and methanol, before commencing operation of the flexible pipe. The document contemplates filling the pipes with the protective fluid whilst the pipe is at a manufacturing plant or at a quayside prior to transport to an installation site, or on a storage reel or carousel. The corrosion protection principle is based on forming a physical barrier by filling all the empty spaces of the annulus with the selected fluid, preventing both water and corrosive fluids from coming into contact with armouring wire. It is important to point out that this principle would not prevent permeation of corrosive gases through the barrier.

In addition, once these gases have permeated to the annulus, it is still possible for bubbles or droplets of $CO_2$ to form in the annulus, which cannot be guaranteed to cross the annulus and permeate to the sea without coming into contact with and adhering to the metal of the armour or may even be trapped in interstices between layers or interstices of the layers.

In any case, the occurrence of damage in coverings, exposing the annulus to the sea, would allow the protective fluid to escape into the sea. Besides the possible environmental impact of this, and depending on the fluid selected, this means there would be gradual ingress of sea water and formation of a corrosive environment associated with the corrosive gases that have permeated. For the case of vertical risers or even flowlines laid on seabed that is not flat, the ingress of corrosive fluids and water into the annulus may facilitate phase segregation between these and the protective fluid due to differences in densities, facilitating corrosion in unprotected sections.

Document EP2729723B1 relates to a flexible pipe that makes use of two annular spaces and a connector, which allows a fluid that has permeated to both annular spaces to be vented. The use of two annular spaces means that the gases that have permeated to the outermost annulus of the pipeline reach a lower concentration than would be expected if using only one annulus. However, although there is a trend for reduction of the concentration in the annulus of tensile armour, it is not known at present what concentration limits of $CO_2$ avoid initiation of the process of stress corrosion and pitting corrosion by $CO_2$ in the outermost annulus.

Once water begins to condense in the innermost annulus, which will have a considerable concentration of corrosive gases, the process of stress corrosion and pitting corrosion by $CO_2$ will be initiated and it will not be possible to stop it, since EP2729723B1 does not envisage forced circulation of fluids in the annulus that could remove the droplets or bubbles of $CO_2$ (or other corrosive gases) that are trapped in interstices between layers.

Document U.S. Pat. No. 8,820,412B2 envisages the use of pipes to replace some wires of tensile armour or pipes enclosed in tapes. The document considers flushing a buffer fluid through the entire length of a riser, the fluid both entering and leaving the riser annulus from the uppermost end. It relates to the concept of using pipes for that buffer fluid that are perforated along their length and the also a concept in which the pipes possess solid walls and are only open at the opposite end to end at which the buffer fluid is introduced.

For the concepts of this document that make use of pipes that are perforated along the length of the flexible pipe, once condensation (or ingress) of water in the annulus begins, injection of fluids through the pipes will be difficult. The interplay of the holes in the pipes, with the gas-liquid boundary line in the annulus, will preventing complete circulation and thus allow a corrosive environment to form.

For the concepts of the document based on the use of pipes that are only open at the opposite end to which fluid is supplied, circulation of fluids is only considered when there is a single segment of flexible pipeline. There is no consideration of use in more than one segment, as it would be necessary to provide interconnection of unperforated pipes to adjacent segments of flexible pipe, which is not envisaged in U.S. Pat. No. 8,820,412B2.

Therefore the technique described in document U.S. Pat. No. 8,820,412B2 is limited to use in systems with only one segment of flexible pipe, which prevents effective application for systems with more than one segment, which is the typical case of flexible pipe systems.

Even in the configuration based on the use of pipes that are perforated along their length or pipes that are only perforated at the end, the circulation of fluids is not sufficient to remove bubbles or droplets of $CO_2$ (or other corrosive gases) that are trapped and adhere to the interstices between layers or interstices of the layers, for example of the pressure armour, which can have a complex geometry (e.g. C profile, Zeta profile, among others).

Document WO2014023311A1 is restricted to solving the problems resulting from corrosion in the pressure armour, the layer that prevents contact of this pressure armour with sea water being called the intermediate sealing sheath, which is inside the tensile armouring. In this case, two independent annular spaces are created, the first between the outer layer of the pipe and the intermediate sealing sheath, and the second between the intermediate sealing sheath and the internal pressure sheath, called the inner sealing sheath in WO2014023311A1.

WO2014023311A1 indicates the use of a drainage layer (i.e. for venting gases) only in the second (innermost) annulus, which contains the pressure armouring. Circulation of fluids for preventing or mitigating corrosion is only envisaged for the pressure armouring, without similar circulation being provided in the first annulus, leaving the tensile armouring exposed to the corrosive medium. WO2014023311A1 further envisages the use of tensile armouring made of composite material, which in itself only represents a recognition that the technology disclosed would not prevent corrosion in the first annulus, if metal armouring were used.

Therefore it is clear that the prior art does not have a flexible pipe capable of allowing displacement of water vapour, $CO_2$, $H_2S$, or bubbles or droplets of $CO_2$, or any other potentially corrosive elements, that have permeated to any layer of the annulus, by reducing the content of $CO_2$ or of $H_2S$ dissolved in the aqueous phase, through forced circulation of $N_2$ or of other non-corrosive fluids through said annulus.

"Any layer of the annulus" means in the metal armouring, in the polymer layers or tapes, at the interfaces and in the interstices of the connector, between the outermost and innermost layers of the annulus of the flexible pipe, etc.

As will be described in more detail below, the present invention aims to at least partially solve the problems of the prior art described above in a practical and efficient manner.

SUMMARY OF THE INVENTION

It is thus desirable to provide a flexible pipe that allows displacement of water vapour, $CO_2$, $H_2S$, or bubbles or droplets of $CO_2$, or any other potentially corrosive element, that have permeated to any layer of the annulus of the pipe.

The present disclosure provides a pipe for control and forced circulation of corrosion-inhibiting fluids in an annulus thereof, the annulus being located between an inner pressure barrier and an outer cover of the pipe and containing a number of layers, the pipe comprising at least one of: two layers of tensile armour within the annulus; at least one injection pipe laid helicoidally on the longitudinal extension of the pipe; at least one return pipe laid helicoidally on the longitudinal extension of the pipe; and a ventilation layer within the annulus, the ventilation layer being configured to facilitate the flow of fluids longitudinally through the annulus of the pipe.

The pipe thus allows for corrosion-inhibiting fluid to be supplied and removed via the injection and return pipes, whilst also providing ventilation tape to enable the fluid may circulate properly within the annulus. The pipe can be of the flexible type, such as used in risers.

Optionally, the ventilation layer comprises ventilation tape laid helicoidally on at least part of the longitudinal extension of the pipe.

Optionally, the ventilation tape comprises grooves across the width of the ventilation tape.

Optionally, the ventilation tape is laid such that the grooves are aligned, forming longitudinal channels relative to the longitudinal axis of the pipe.

Optionally, the ventilation tape comprises holes through the width of the ventilation tape.

Optionally, the ventilation tape is laid such that holes are aligned to form longitudinal channels relative to the longitudinal axis of the pipe.

Optionally, the ventilation tape is made of one of: cloth; metal; polymer; aramid threads; glass filaments; extruded material; and helicoidally braided tapes.

Optionally, the pipe further comprises a layer of anti-swelling or anti-extrusion tape applied helicoidally on the inner pressure barrier, wherein the tape is applied as successive overlapping loops, and wherein the tape contains holes to allow fluid to pass through.

Optionally, the ventilation layer is positioned between two layers of anti-friction tape, the two layers of anti-friction tape being positioned between the two layers of tensile armour.

Optionally, at least one injection pipe and at least one collecting pipe are positioned as replacements for wires of the tensile armour.

Optionally, at least one injection pipe and at least one collecting pipe are arranged helicoidally within a filling layer, consisting of structural elements that protect the pipes from radial compression.

Optionally, at least one injection pipe and at least one collecting pipe are positioned on the outer cover of the pipe.

Optionally, at least one injection pipe and at least one collecting pipe comprise a cross-sectional shape selected from: round; oval; and rectangular.

Optionally, at least one injection pipe and at least one collecting pipe comprise metal coated with a polymer layer.

Optionally, at least one injection pipe and at least one collecting pipe are of the hose type that is resistant to hydrostatic collapse.

Optionally, the ventilation layer is configured to increase the area of voids in the cross-section of the annulus of the pipe.

The disclosure also provides a riser formed by connecting a plurality of pipes according to any one of the preceding claims.

The disclosure also provides a method of constructing a pipe, the pipe being for control and forced circulation of corrosion-inhibiting fluids in an annulus thereof, the annulus being located between an inner pressure barrier and an outer cover of the pipe and containing a number of layers, the method comprising: providing two layers of tensile armour within the annulus; providing at least one injection pipe laid helicoidally on the longitudinal extension of the pipe; providing at least one return pipe laid helicoidally on the longitudinal extension of the pipe; and providing a ventilation layer within the annulus to increase the area of voids in the cross-section of the annulus of the pipe, the ventilation layer being configured to facilitate the flow of fluids longitudinally through the annulus of the pipe.

The disclosure also provides a method of inhibiting corrosion in a pipe having an annulus, the annulus being located between an inner pressure barrier and an outer cover of the pipe and containing a number of layers, the method comprising: providing corrosion-inhibiting fluid to the pipe annulus via at least one injection pipe laid helicoidally on the longitudinal extension of the pipe; circulating the corrosion-inhibiting fluid within the annulus of the pipe, including through a ventilation layer provided within the annulus to increase the area of voids in the cross-section of the annulus; removing corrosion-inhibiting fluid from the pipe annulus via at least one return pipe laid helicoidally on the longitudinal extension of the pipe.

The disclosure also provides a flexible pipe for control and forced circulation of fluids in the annulus thereof, wherein the annulus comprises a number of layers, including: at least two layers of tensile armour arranged in at least two directions of braiding; at least one injection pipe laid helicoidally on the entire longitudinal extension of the flexible pipe; at least one return pipe laid helicoidally on the entire longitudinal extension of the flexible pipe; wherein the annulus comprises a ventilation layer that comprises means for facilitating the flow of fluids.

The disclosure also provides a flexible pipe for control and forced circulation of corrosion-inhibiting fluids in the annulus thereof, in which the annulus located between the polymer layers (6) and (8) contains a number of layers, including: at least two layers of tensile armour (1) arranged in at least two directions of braiding; at least one injection pipe laid helicoidally on the entire longitudinal extension of the flexible pipe; at least one return pipe laid helicoidally on the entire longitudinal extension of the flexible pipe characterized in that the annulus comprises at least one ventilation layer 10 that comprises means for facilitating the flow of fluids longitudinally to the pipeline.

Optionally, the ventilation layer 10 comprises at least one ventilation tape 10 laid helicoidally on at least part of the longitudinal extension of the flexible pipe, in which the ventilation tape 10 comprises at least one of: longitudinal grooves 11 on its entire length, wherein when the ventilation tape 10 is laid, successive grooves 11 are aligned, forming longitudinal channels relative to the longitudinal axis of the pipeline; or longitudinal holes 12 on its entire length, wherein when the ventilation tape 10 is laid, successive longitudinal holes 12 are aligned, forming longitudinal channels.

Optionally, at least one ventilation tape 10 is made of one of: cloth; metal; polymer; aramid threads; glass filaments; extruded material; and helicoidally braided tapes.

Optionally, the annulus additionally comprises a layer of anti-swelling or anti-extrusion tapes of the pressure barrier applied helicoidally thereon, with overlap and containing holes for preventing the formation of a second annulus.

Optionally, the ventilation layer 10 is positioned internally to the layer of anti-friction tape 9, the layer of anti-friction tape 9 being positioned between the at least two layers of tensile armour 1 arranged in at least two directions of braiding.

Optionally, at least one injection pipe 2 and at least one collecting pipe 2 are positioned in one of: as replacement for at least one wire of the tensile armour 1; or arranged helicoidally adjacent to a filling layer 3, consisting of structural elements that protect the pipes from radial compression.

Optionally, at least one injection pipe 2 and at least one collecting pipe 2 comprise a cross-section format selected from: round 2A; oval 2B; and rectangular 2C, the injection pipe 2 and the collecting pipe 2 being metallic and coated with a polymer layer.

Optionally, at least one injection pipe 2 and at least one collecting pipe 2 are of the hose type that is resistant to hydrostatic collapse.

BRIEF DESCRIPTION OF THE FIGURES

The detailed description presented hereunder refers to the appended figures and their respective reference numbers.

DETAILED DESCRIPTION OF THE INVENTION

First, it is emphasized that the following description is based on a preferred embodiment. However, as will be obvious to a person skilled in the art, the invention is not limited to this particular embodiment.

The present disclosure relates to a flexible pipe for control and forced circulation of fluids in the annulus thereof. The annulus can comprise a number of layers, including one or more of: at least two layers of tensile armour arranged in at least two directions of braiding; at least one injection pipe laid helicoidally on the entire longitudinal extension of the flexible pipe; at least one return pipe laid helicoidally on the entire longitudinal extension of the flexible pipe. The annulus can comprise a ventilation layer that comprises means for facilitating the flow of fluids. These features will become clearer from the figures and description given hereunder.

Figure 1:
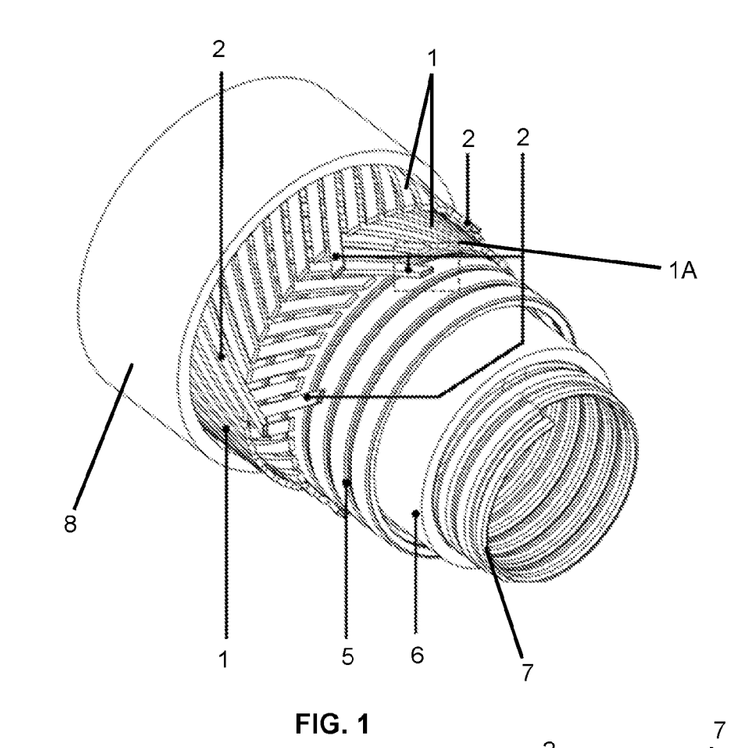
FIG. 1 shows a schematic view of a flexible pipe according to a first optional configuration.

FIG. 1 shows a schematic view of a flexible pipe according to a first optional configuration. It can be seen that the flexible pipe comprises an annulus. The annulus comprises a number of layers. Those layers, in the depicted embodiment, include two layers of tensile armour 1 arranged in at least two directions of braiding, a pressure armour 5 and a pressure or fluid barrier 6, besides a carcass 7 (e.g. to help prevent pipe collapse) and an outer sheath 8.

It will be understood that a person skilled in the art of petroleum technology, especially of flexible pipes, will know how to determine the best various elements making up each of these layers.

In addition, the present disclosure envisages employing at least one injection pipe and one return pipe laid helicoidally to replace at least two wires of tensile armour 1. The injection pipe and return pipe can be laid in different directions of braiding.

These injection or return pipes 2 make injection and circulation of fluids possible. The recirculation of fluids can ensure evaporation of the water molecules, including those trapped in the interstices of the tensile armour 1 and of the pressure armour 5 or under the pressure armour 5. Such water molecules may have permeated from the interior of the flexible pipe, and evaporating the water molecules prevents condensation or saturation and the consequent appearance of aqueous phase, which constitutes a necessary condition for the corrosion process. As such, the injection pipes 2 can transport the fluid to the annulus of a pipe segment, from an upstream source (e.g. via an adjacent pipe segment). Conversely, the return pipes 2 can be used to receive fluid from the annulus of a pipe segment and return it to the source (again, e.g. via an adjacent pipe segment). The mechanisms for dispersing and collecting the fluid from the pipe annulus may be provided in connectors at the end of pipe segments, and are not considered in detail in this document.

The fluids that may be employed include: inert gases (such as $N_2$), non-corrosive gases (such as $CH_4$), or liquids (such as ethanol and MEG). It is emphasized, however, that a person skilled in the art will be able to determine the best fluids to use, so that this selection does not limit the scope of protection of the present invention.

Figure 1A:
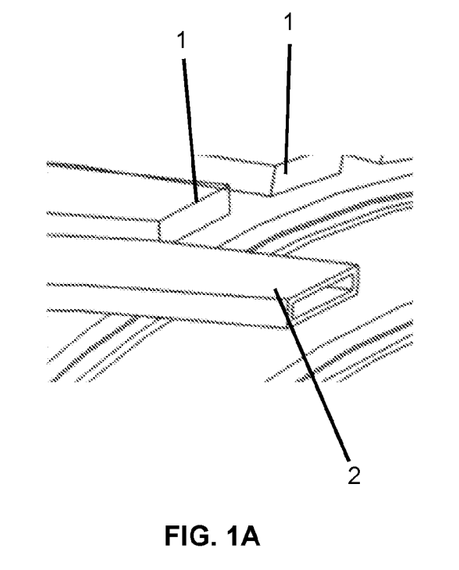
FIG. 1A shows detail 1A from FIG. 1.
Figure 1B:
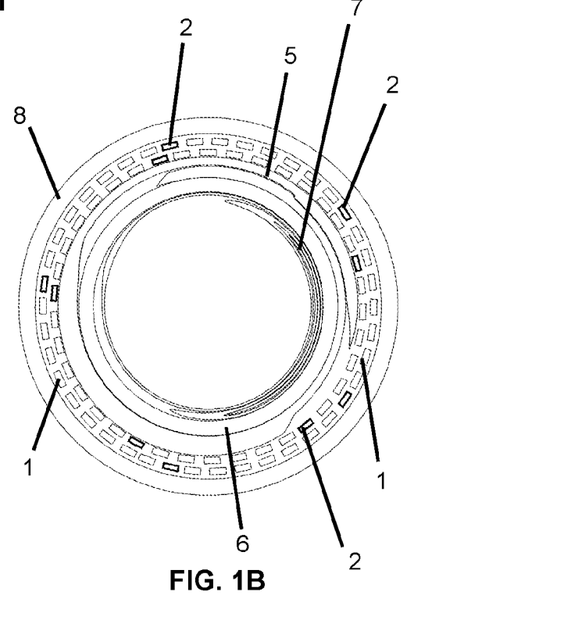
FIG. 1B shows a front view of the optional configuration of flexible pipe shown in FIG. 1.

FIG. 1B shows a front view of the configuration of flexible pipe shown in FIG. 1. It can be seen in this figure that a plurality of wires of the tensile armour 1 has been replaced with injecting/collecting pipes 2, so as to cause intensive recirculation of fluids.

FIG. 1A shows detail 1A from FIG. 1, in which it can be seen that the cross-section format optionally adopted for the injecting/collecting pipes 2 in rectangular in the depicted configuration. This format has the advantage that it is similar to the format of the wires of the tensile armour 1. This can generate less friction between the pipe 2 and the wire of the armour 1.

Figure 2:
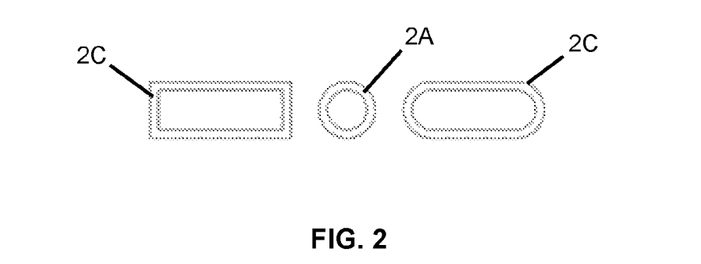
FIG. 2 shows three configurations of cross-section formats adopted for the injecting/collecting pipes.

FIG. 2 shows three possible formats of cross-section format that may be adopted for the injecting/collecting pipes 2. The format options include round 2a and oval 2b formats, besides the rectangular format 2c. It is emphasized, however, that other options may be adopted freely for the convenience of the designer, provided the flow conditions for the particular application are maintained.

Optionally, the injecting/collecting pipes 2 may be metallic. In that case, they may be further coated with a polymer layer to prevent metal-to-metal contact with the tensile armour 1.

Figure 3:
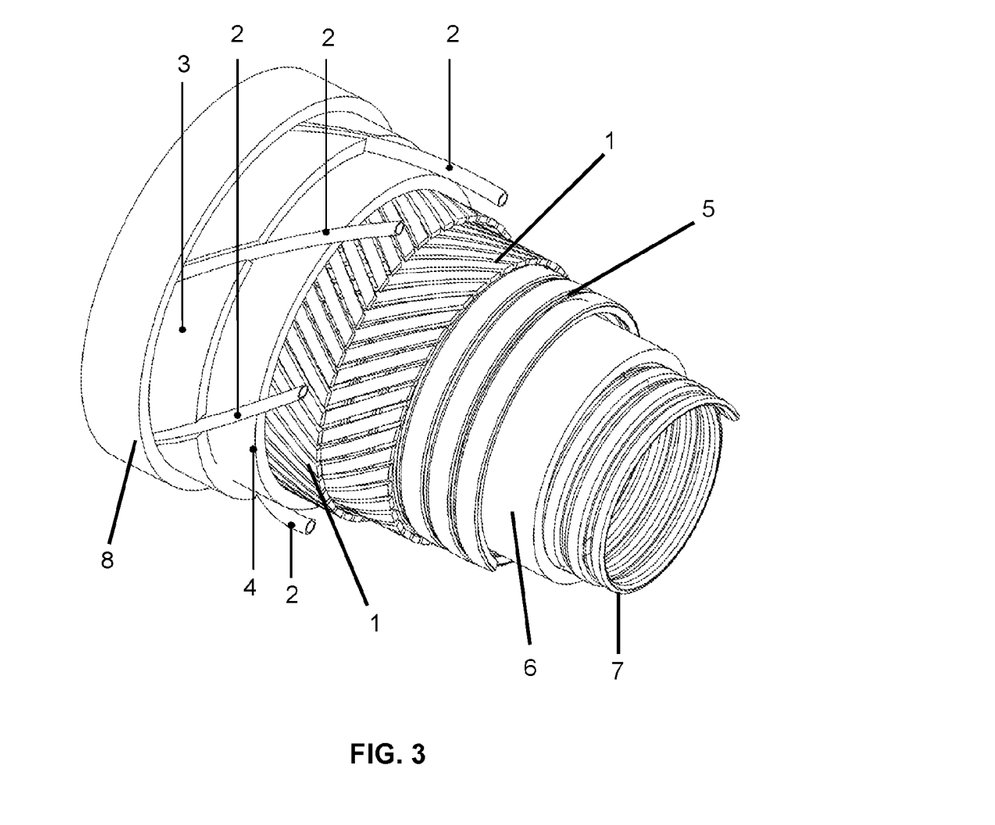
FIG. 3 shows a schematic view of a flexible pipe according to a second optional configuration.

FIG. 3 shows a schematic view of a flexible pipe according to a second optional configuration. It can be seen that the flexible pipe comprises an annulus that comprises a number of layers. The layers may include two layers of tensile armour 1 arranged in at least two directions of braiding, a pressure armour 5 and a pressure barrier 6, at least one layer of anti-buckling tapes, at least one layer of anti-wear tapes 4 or anti-buckling tapes, besides the outer sheath and the carcass.

In this optional configuration, the flexible pipe comprises at least one injecting/collecting pipe 2 arranged helicoidally permeated in a filling layer 3, which may be positioned above the layer of anti-wear or anti-buckling tapes 4. As illustrated, a number of injecting/collecting pipes 2 can be arranged helicoidally, throughout the filling layer 3.

When this configuration is adopted, the filling layer 3, as well as the collecting/injecting pipe(s) 2, may be positioned on the outer tensile armour 1, or on the anti-buckling tapes, or on anti-wear tapes 4 (which can be installed on the anti-buckling tapes). This design can be employed with the use of additional anti-buckling tape on the layers of the pipes.

As can be seen, in the optional illustration in FIG. 3, the round format is adopted for the cross-section of the injecting/collecting pipe 2. However, as already stated, any cross-section format may be adopted depending on each application.

When this configuration is adopted, optionally, the injection and return pipes 2 are of the hose type that is resistant to hydrostatic collapse.

In a third optional configuration, the filling layer 3, comprising the injecting/collecting pipe(s) 2 arranged helicoidally, is positioned on an outer cover of each segment. This configuration can provide mechanical protection against damage to the outer cover that may occur during handling and installation of the flexible pipe. This configuration can also use a layer of anti-buckling tape on the layer of injecting/collecting pipes 2.

Figure 4:
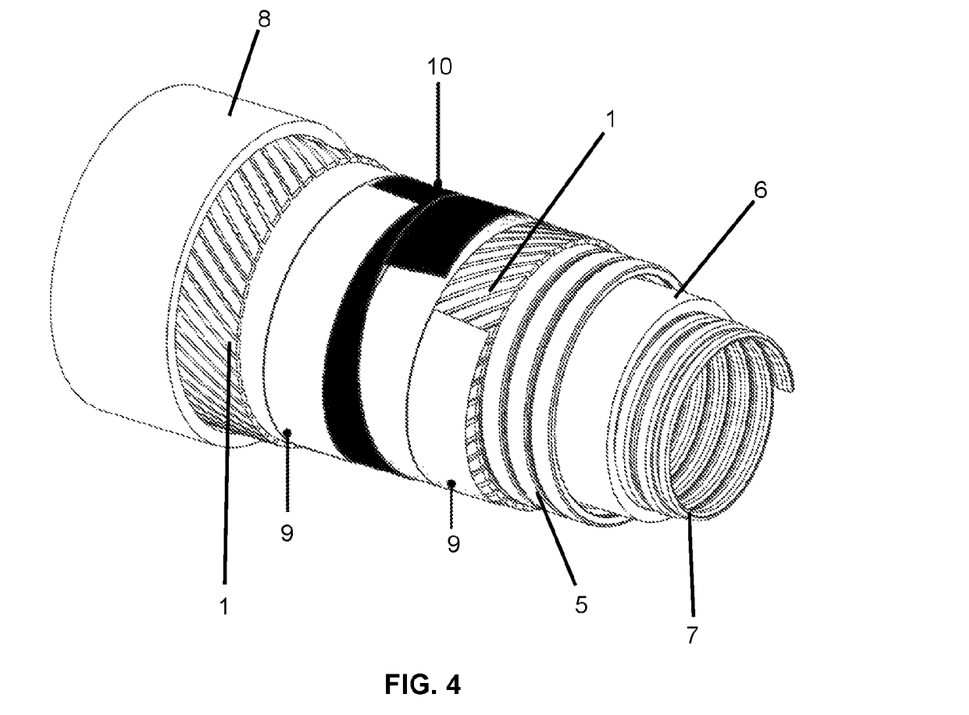
FIG. 4 shows a schematic view of a flexible pipe according to a third optional configuration.

FIG. 4 shows a schematic view of a flexible pipe according to a third optional configuration. It can be seen that the flexible pipe comprises an annulus that comprises a number of layers. The layers may include tensile armour 1, optionally two or more layers of tensile armour 1 arranged in at least two directions of braiding, a pressure armour 5 and a pressure barrier 6, at least one layer of anti-buckling tapes, and at least one layer of anti-wear tapes 4.

When this configuration is adopted, optionally, the injection and return pipes 2 are of the hose type that is resistant to hydrostatic collapse.

In this figure, it can be seen in particular that the flexible pipe comprises at least one layer of anti-friction tape 9, positioned between the two layers of tensile armour 1 that are arranged in at least two directions of braiding. These tapes are used to minimize friction between the two layers of tensile armour 1. However, the layer of anti-friction tape 9 has the disadvantage that it does not facilitate circulation of fluids through the annulus of the flexible pipe.

For the reason described in the preceding paragraph, it is envisaged that the layers of anti-friction tape 9 should comprise a ventilation layer 10 that comprises means for facilitating the flow of fluids in this region.

Thus, in other words, it is envisaged that the flexible pipe of this configuration should comprise a ventilation layer 10 between two layers of anti-friction tape 9, which in their turn are positioned between two layers of tensile armour 1 arranged radially in at least two directions of braiding.

Optionally, the layers of anti-friction tape 9 comprise an anti-friction tape 9 laid helicoidally on at least part of the longitudinal extension of the flexible pipe.

Figure 4A:
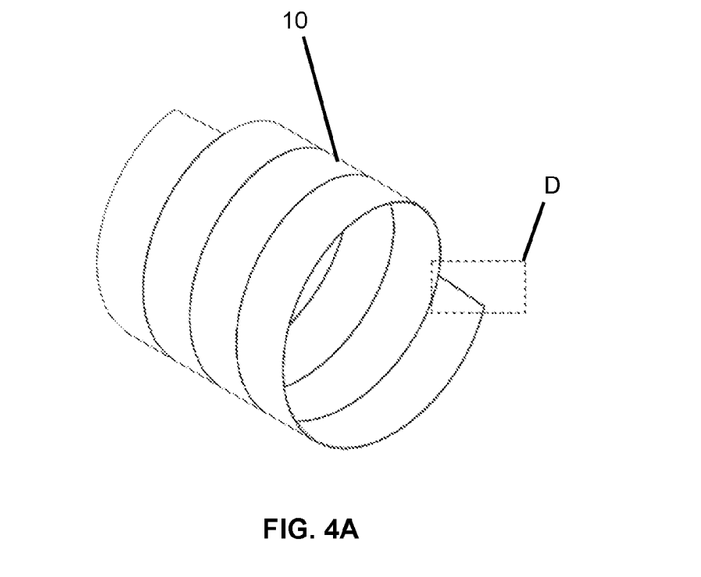
FIG. 4A shows a view of a ventilation tape laid helicoidally.

Similarly, the ventilation layer 10 optionally comprises a ventilation tape 10 laid helicoidally on at least part of the longitudinal extension of the flexible pipe, as illustrated schematically in FIG. 4A.

Optionally, to ensure higher pressure in the injection of fluids, necessary for entrainment of the corrosive fluids, a high-strength tape may be installed on the outer cover of the segment and, if necessary, a protective cover on this tape.

Figure 5:
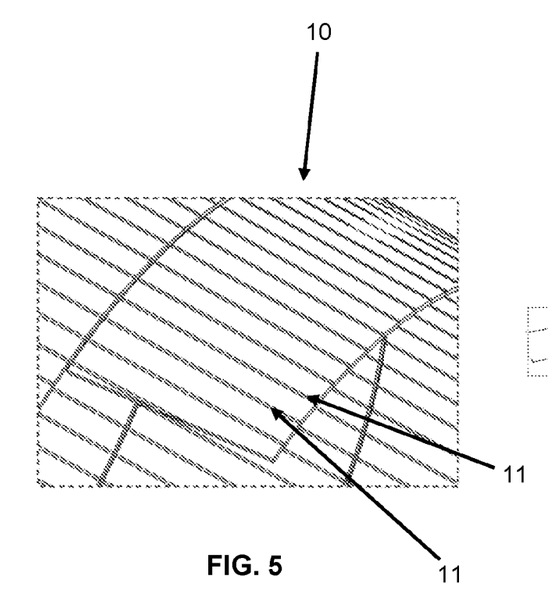
FIG. 5 shows detail of a section of ventilation tape, according to an optional configuration.
Figure 5A:
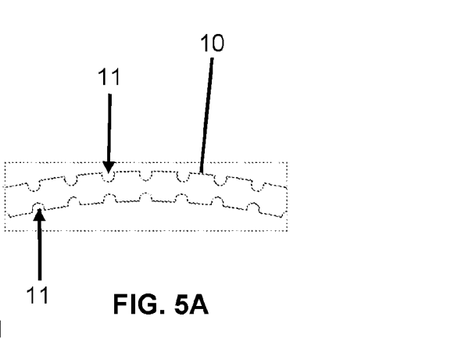
FIG. 5A shows a closer front view of the section of the configuration of ventilation tape in FIG. 5.

FIG. 5 shows detail of a section of ventilation tape 10, as shown in FIG. 4, according to a first optional configuration of ventilation tape 10. FIG. 5A shows a closer front view (i.e. cross sectionally through the pipe) of the section of the configuration of ventilation tape 10 in FIG. 5.

According to FIGS. 5 and 5A, it can be seen that the ventilation tape 10 comprises grooves 11. The grooves are across the width of the tape 10. As shown, the grooves are arranged in the longitudinal direction of the pipeline, over its entire length. That is, when the ventilation tape 10 is laid helicoidally around the pipe, successive grooves 11 can be aligned, forming channels that facilitate the flow of fluids along the pipe.

Figure 6:
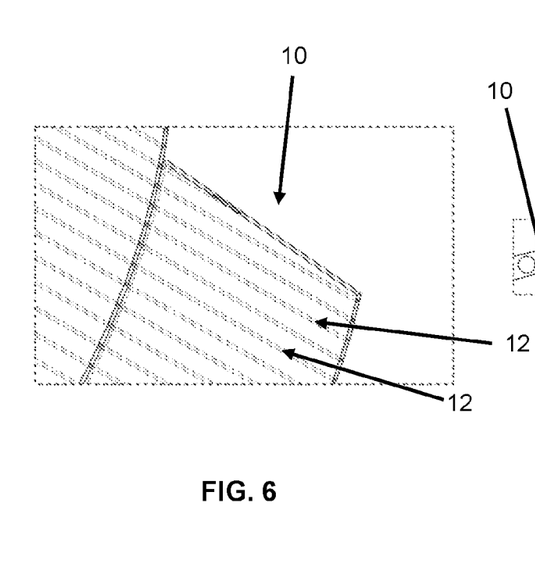
FIG. 6 shows detail D of a section of ventilation tape as shown in FIG. 4, according to an optional configuration.
Figure 6A:
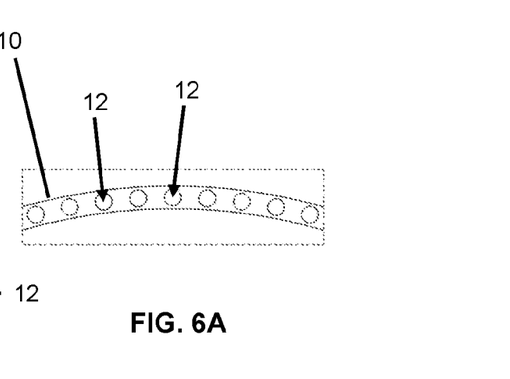
FIG. 6A shows a closer front view of the section of the configuration of ventilation tape in FIG. 6.

FIG. 6 shows detail D of a section of ventilation tape 10, as shown in FIG. 4, according to a second optional configuration of ventilation tape 10. FIG. 6A shows a closer front view of the section of the configuration of ventilation tape 10 in FIG. 6 (i.e. cross sectionally through the pipe).

According to FIGS. 6 and 6A, it can be seen that the ventilation tape 10 comprises holes 12 across the width of the tape 10. It will be understood that this does not necessarily mean the grooves 11 are perpendicular to the sides of the tape 10, but rather that they cross the width of the tape 10 from one side of the tape 10 to the other, and that that crossing may be at an angle. As shown, the holes are arranged in the longitudinal direction of the pipeline, over its entire length. That is, when the ventilation tape 10 is laid helicoidally, successive longitudinal holes 12 can be aligned, forming channels that facilitate the flow of fluids.

Although two different configurations of ventilation tapes 10 have been presented, it is emphasized that a great variety of configurations may be adopted for these tapes, so that the configurations of ventilation tapes 10 are not limited to those presented in FIGS. 5, 5A, 6, and 6A.

Therefore the ventilation layer 10, in any configuration, can provide a larger area of flow in the annulus of each segment of the flexible pipe, increasing the area of voids of the cross-section of the flexible pipe, and consequently making the circulating flow more uniform in the annulus of the structure.

The ventilation layer 10 may be made of any of cloth, metal, polymer, aramid threads, glass filaments, woven material of any type of thread whose configuration is maintained by means of adhesive tape or agglomerating elements, such as polymers or matrices of any material that form a composite component, with the aim of maintaining the geometry of the barrier according to the original configuration of the flexible pipe before the factory hydrostatic test or as closes to this as possible. It may also be extruded, or in the form of tapes laid helicoidally along the segment with grooves 11 as shown in the accompanying figures.

It is emphasized that although the ventilation layer 10 has been positioned, in FIGS. 5 and 6, between two layers of tensile armour 1 arranged in at least two directions of braiding, it may be positioned at different interfaces between layers arranged radially in the annulus. For example, the ventilation layer 10 may be positioned: between the outer armour and the cover or layer superposed on it; and between the barrier, or layer laid on the barrier, and the pressure armour 5.

In addition, in the flexible pipes in which the pressure armour 5 is employed, in order to prevent bubbles or droplets of $CO_2$ with dissolved water being trapped in positions where they are difficult to remove, or as a result of creep or swelling of the barrier 6, which restricts the circulation of fluids on the inner face of the pressure armour 5, it is possible to employ an anti-swelling or anti-extrusion layer in the form of tape or an extruded layer. This layer can contain holes to avoid formation of a second annulus (i.e. by compartmentalising the main annulus into two concentric annuli), which may cause collapse by rapid depressurization of the flexible pipe. If the tape is laid helicoidally on the barrier 6, with successive helical loops overlapping the previous loop, the tape itself may comprise holes to allow fluid to pass through, for the reasons mentioned above.

The anti-swelling layer can be laid helicoidally during manufacture of the flexible pipeline with the application of sufficient tension for the barrier to be confined. Alternatively, the ventilation layers 10 and the anti-swelling layer may have their functions incorporated in a single layer.

For greater strength, the ventilation layer 10 may comprise a core of material with higher compressive strength, to maintain the geometry of the layers and prevent the development of undesirable failure modes, and may further optionally be covered on the upper and lower faces with a polymer layer that envelops the core.

In addition, the use of anti-wear tapes may make it desirable to: increase the thicknesses that take into account the wear resulting from friction with the metallic layers, due to the cyclic bending loads of the flexible pipe; and/or use composites or metallic materials with the aim of maintaining the configuration of the layers and the radial stiffness of the structure of the flexible pipe. For example, the anti-wear tapes 4 could be coated with polymer material, with the aim of minimizing wear of these tapes or of the armour of the flexible pipe due to the dynamic loading, preventing changes of the configuration of the flexible pipe that cause loosening of its layers.

Optionally, with the aim of obtaining a structure of flexible pipe that is balanced for torsion, when it is subjected to loads such as tension and pressure, the lay angles of the tensile armour 1 may be adjusted with the aim of compensating the torsional imbalance caused by the presence of pipes mounted helicoidally on the body of the flexible pipe.

Thus, the flexible pipe of the present disclosure is capable of allowing flow between any layer of the flexible pipe and of making the conditions of the annulus uniform, reducing the concentration of corrosive gases. These advantages are achieved with the use of individual pipes for communication and control of the annulus of each segment of the flexible pipe. For example, introduction of the ventilation layers 10, described in the preceding paragraphs, facilitate this forced flow.

Optionally, the tensile armouring 1 and/or the pressure armouring, in the structure of the flexible pipe, are coated by anodic metallization for anticorrosive protection additional to the cathodic protection designed for the system of flexible pipes.

Anticorrosive coating, of aluminium and aluminium alloys, applied directly on the surface of steel armour, increases its service life considerably, when in contact with the corrosive medium.

Compressive anticorrosive coating applied directly on the surface of the steel armour is capable of introducing residual compressive stresses in the steel armour, greatly increasing its fatigue life even when subjected to severe plastic deformation.

Therefore the present disclosure provides a flexible pipe capable of allowing displacement of water vapour that has permeated to the annulus, $CO_2$, $H_2S$ and bubbles or droplets of $CO_2$ trapped in the metal armouring, in the polymer layers or in the tapes, or at the interfaces and in the interstices of the connector and of the layers or between layers of the annulus of the flexible pipe, and consequently reducing the content of $CO_2$ or $H_2S$ dissolved in the aqueous phase, through forced circulation of $N_2$ or of other non-corrosive fluids through said annulus.

The pipe of the present disclosure further allows reduction of the concentration of corrosive gases such as $CO_2$ and $H_2S$ in the water in the case of flooding of the annulus with water, as well as entraining or breaking the bubbles or droplets of $CO_2$ with dissolved water, which may be trapped in the metal armouring, in the polymer layers or in the tapes, or at the interfaces and in the interstices of the layers of the pipe in the connector and of the layers or between layers of the annulus of the flexible pipe.

Accordingly, the flexible pipe mitigates the aggressiveness of pitting corrosion, which is one of the factors in the initiation of the process of stress corrosion by $CO_2$, on maximizing the homogeneity of the corrosive environment of the annulus, besides promoting reduction of the concentration of corrosive gases, as mentioned.

Especially in annular spaces with loss of integrity, the circulation of $N_2$ or some other fluid at high velocity intensifies the entrainment and expulsion of corrosive fluids out of the annulus via the damaged areas of the outer cover (or holes made after installation of the flexible pipe for directing the flow).

Accordingly, the effects of these corrosive fluids are minimized, extending the possibility of operation until maintenance is effective, if necessary, if the condition of the annulus exceeds the limits of the conditions in which the corrosive fluids initiate the mechanisms of failure mentioned above.

Countless variations falling within the scope of protection of the present application are permitted. This reinforces the fact that the present invention is not limited to the particular configurations/embodiments described above. As such, modifications of the above-described apparatuses and methods, combinations between different variations as practicable, and variations of aspects of the invention that are obvious to those of skill in the art are intended to be within the spirit and scope of the claims.

The invention claimed is:

1. A pipe for control and forced circulation of corrosion-inhibiting fluids in an annulus thereof, the annulus being located between an inner pressure barrier and an outer cover of the pipe and containing a number of layers, the pipe comprising:
    two layers of tensile armor within the annulus;
    at least one injection pipe laid helicoidally on a longitudinal extension of the pipe;
    at least one return pipe laid helicoidally on the longitudinal extension of the pipe; and
    a ventilation layer within the annulus, the ventilation layer comprising ventilation tape providing longitudinal channels relative to a longitudinal axis of the pipe to facilitate a flow of fluids longitudinally through the annulus of the pipe.

2. The pipe according to claim 1, wherein the ventilation tape is laid helicoidally on at least part of the longitudinal extension of the pipe.

3. The pipe according to claim 2, wherein the ventilation tape comprises grooves across a width of the ventilation tape.

4. The pipe according to claim 3, wherein the ventilation tape is laid such that the grooves are aligned, forming the longitudinal channels relative to the longitudinal axis of the pipe.

5. The pipe according to claim 2, wherein the ventilation tape comprises holes through a width of the ventilation tape.

6. The pipe according to claim 5, wherein the ventilation tape is laid such that holes are aligned to form the longitudinal channels relative to the longitudinal axis of the pipe.

7. The pipe according to claim 2, wherein the ventilation tape is made of one of: cloth; metal; polymer; aramid threads; glass filaments; extruded material; and helicoidally braided tapes.

8. The pipe according to claim 1, further comprising a layer of anti-swelling or anti-extrusion tape applied helicoidally on the inner pressure barrier, wherein the tape is applied as successive overlapping loops, and wherein the tape contains holes to allow fluid to pass through.

9. The pipe according to claim 1, wherein the ventilation layer is positioned between two layers of anti-friction tape, the two layers of anti-friction tape being positioned between the two layers of tensile armor.

10. The pipe according to claim 1, wherein at least one injection pipe and at least one collecting pipe are positioned as replacements for wires of the tensile armor.

11. The pipe according to claim 1, wherein at least one injection pipe and at least one collecting pipe are arranged helicoidally within a filling layer, consisting of structural elements that protect the at least one injection pipe and the at least one collecting pipe from radial compression.

12. The pipe according to claim 1, wherein at least one injection pipe and at least one collecting pipe are positioned on the outer cover of the pipe.

13. The pipe according to claim 1, wherein at least one injection pipe and at least one collecting pipe comprise a cross-sectional shape selected from: round; oval; and rectangular.

14. The pipe according to claim 1, wherein at least one injection pipe and at least one collecting pipe comprise metal coated with a polymer layer.

15. The pipe according to claim 1, wherein at least one injection pipe and at least one collecting pipe are of a hose type that is resistant to hydrostatic collapse.

16. The pipe according to claim 1, wherein the ventilation layer is configured to increase an area of voids in a cross-section of the annulus of the pipe.

17. A riser formed by connecting a plurality of pipes according to claim 1.

18. A method of constructing a pipe, the pipe being for control and forced circulation of corrosion-inhibiting fluids in an annulus thereof, the annulus being located between an inner pressure barrier and an outer cover of the pipe and containing a number of layers, the method comprising:
providing two layers of tensile armor within the annulus;
providing at least one injection pipe laid helicoidally on a longitudinal extension of the pipe;
providing at least one return pipe laid helicoidaily on the longitudinal extension of the pipe; and
providing a ventilation layer comprising ventilation tape within the annulus to increase an area of voids in a cross-section of the annulus of the pipe, the ventilation layer being configured to provide longitudinal channels relative to a longitudinal axis of the pipe to facilitate a flow of fluids longitudinally through the annulus of the pipe.

19. A method of inhibiting corrosion in a pipe having an annulus, the annulus being located between an inner pressure barrier and an outer cover of the pipe and containing a number of layers, the method comprising:
providing corrosion-inhibiting fluid to the pipe annulus via at least one injection pipe laid helicoidaily on a longitudinal extension of the pipe;
circulating the corrosion-inhibiting fluid within the annulus of the pipe, including through longitudinal channels relative to a longitudinal axis of the pipe formed in ventilation tape of a ventilation layer provided within the annulus to increase an area of voids in a cross-section of the annulus; and
removing corrosion-inhibiting fluid from the pipe annulus via at least one return pipe laid helicoidally on the longitudinal extension of the pipe.

* * * * *